(12) United States Patent
Khattak et al.

(10) Patent No.: US 11,591,473 B2
(45) Date of Patent: Feb. 28, 2023

(54) TIRE-RUBBER AND FIBER REINFORCED HIGH PERFORMANCE ASPHALT COMPOSITE (RUFIAC)

(71) Applicant: University of Louisiana at Lafayette, Lafayette, LA (US)

(72) Inventors: Mohammad Jamal Khattak, Lafayette, LA (US); Mohammad Reza-Ul-Karim Bhuyan, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 142 days.

(21) Appl. No.: 16/793,125

(22) Filed: Feb. 18, 2020

(65) Prior Publication Data

US 2020/0263035 A1  Aug. 20, 2020

Related U.S. Application Data

(60) Provisional application No. 62/806,925, filed on Feb. 18, 2019.

(51) Int. Cl.
*C08L 95/00*  (2006.01)

(52) U.S. Cl.
CPC .......... *C08L 95/00* (2013.01); *C08L 2205/16* (2013.01); *C08L 2555/52* (2013.01); *C08L 2555/86* (2013.01)

(58) Field of Classification Search
CPC ....................................................... C08L 95/00
See application file for complete search history.

(56) References Cited

U.S. PATENT DOCUMENTS

| 2011/0196073 A1* | 8/2011 | Fee | .......................... C08L 95/00 524/68 |
| 2015/0080505 A1* | 3/2015 | Blyth | ....................... C08K 5/01 524/64 |

* cited by examiner

*Primary Examiner* — Arrie L Reuther
(74) *Attorney, Agent, or Firm* — Kean Miller LLP; Russel O. Primeaux; Lauren J. Rucinski

(57) ABSTRACT

The current invention is a novel high performance asphalt mixture using optimum dosages of fiber and tire-rubber. Specifically, this invention provides a process for developing high performance asphalt composite by augmenting the conventional mixtures with the optimum dosages of microfiber and recycled tire-rubber particles (RuFiAC mixtures).

15 Claims, 3 Drawing Sheets

TIRE-RUBBER AND FIBER REINFORCED HIGH PERFORMANCE ASPHALT COMPOSITE (RUFIAC)

CROSS REFERENCE TO RELATED APPLICATIONS

This application claims priority to the Provisional Patent Application U.S. No. 62/806,925 entitled "Tire-Rubber and Fiber Reinforced High Performance Asphalt Composite (RuFiAC)," filed Feb. 18, 2019.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

SUMMARY OF THE INVENTION

Fiber reinforced HMA and tire-rubber modified HMA have unique independent characteristics. The current invention is a novel high performance asphalt mixture using optimum dosages of fiber and tire-rubber. Specifically, this invention provides a process for developing high performance asphalt composite by augmenting the conventional mixtures with the optimum dosages of microfiber and recycled tire-rubber particles (RuFiAC mixtures). The addition of the fibers will significantly increase the stiffness, strength, and fracture toughness under tensile loading. And the tire-rubber particles improve the resilience and viscoelastic characteristics under compressive loading. The above mechanisms will enhance the fracture toughness of the RuFiAC mixtures thus improving the resistance to crack in flexible pavement systems.

DESCRIPTION OF THE DRAWINGS

The drawings constitute a part of this specification and include exemplary embodiments of the Tire-Rubber and Fiber Reinforced High Performance Asphalt Composite (RuFiAC), which may be embodied in various forms. It is to be understood that in some instances, various aspects of the invention may be shown exaggerated or enlarged to facilitate an understanding of the invention. Therefore the drawings may not be to scale.

BACKGROUND

Figure 1:
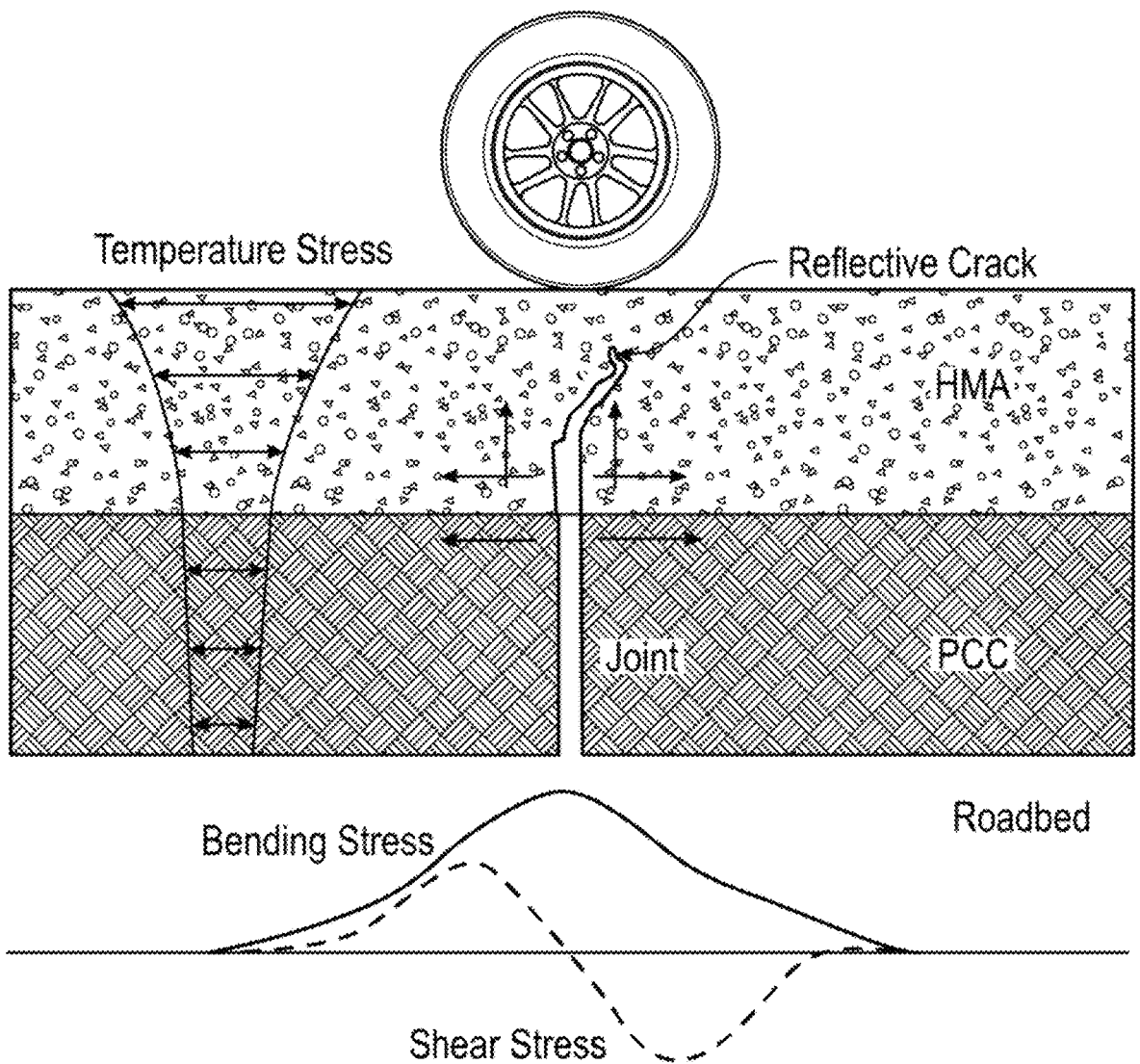
FIG. 1 is Mechanism of reflective cracks.

Conventionally, fibers have been used in stone matrix asphalt (SMA) and open graded friction course (OGFC) mixtures to reduce the drained down effect of the binder. Recently, fiber inclusion in hot mix asphalt (HMA) mixtures have gained popularity due its role in enhancing engineering characteristics including: strength, stiffness, durability, resistance to permanent deformation, and fatigue & reflective cracking. Prior studies have found that enhanced mechanical properties of blended polypropylene and aramid reinforced fiber HMA mixtures result in high service life, reduced life-cycle cost, and 33% reduction in $CO_2$ immersion due to low maintenance. Other studies have reported that the blended polypropylene and aramid fibers reinforced HMA mixtures improve the mechanical properties as well as resistance to permanent deformation and fatigue cracking. It was found that the relationship between crack growth rate and C*-integral showed 40 times higher resistance to crack growth. Further, the control pavement test section exhibited 3 times more minor cracks than the fiber reinforced section after 2 years of service life.

Other studies have evaluated the performance of several types of fibers in HMA mixtures and found that the polyester and polyacrylonitrile enhanced the fatigue life and rutting resistance relative to lignin and asbestos fibers due to greater networking effects as well as geometry and physical aspects. On the other hand, the lignin and asbestos fibers exhibited better flexural strength and strain capacity, which was attributed to greater specific surface areas and greater asphalt absorption and stabilization. Finally, one prior study investigated the reinforcing effect of various types of fibers at −20° C. using indirect tensile strength test and concluded that adequate use of steel fibers could significantly enhance the cracking resistance at low temperature. The diameter of 0.4 mm and length of 30 mm exhibited the best mechanical characteristics for steel fiber reinforced HMA mixtures.

For several decades the recycled tire-rubber particles have been used to modified HMA mixtures. Tire-rubber modified HMA have shown improved strength, stiffness, viscoelastic characteristics, environmental benefits, life-cycle costs, and field performance. The mixing of tire-rubber can be achieved primarily through wet and dry processes. In the wet process powder tire-rubber particles are blended with asphalt binder at high temperature (<15% by wt. of binder). On the other hand, the dry process allows for tire-rubber addition as a replacement of aggregates (up to 3% by wt. of mix) and uses larger size particles. Dry process has been perfected over time. Its design requires gap graded gradation and use of anti-stripping agent such as hydrated lime. Dry process is preferred because it allows for direct addition of tire-rubber without high temperature processing which saves energy and minimizes $CO_2$ emissions. Tire-rubber asphalt mixtures using dry process have more favorable Marshall's resistance than conventional mixtures. The dry process has also showed a better performance than the wet process in rutting resistance of mixtures at intermediate temperatures and resistance to rutting for crumb rubber modified SMA mixture using dry process, was similar to the SBS modified using the wet process. The fatigue life and rut resistance are significantly increased using both processes. However, the dry process mixtures shows more freeze thaw damage but exhibits equal performance once modified with hydrated lime.

This invention addresses the use of Tire-Rubber and Fiber Reinforced High Performance Asphalt Composite (RuFiAC) mixtures and their incorporation into the asphalt mix design to enhance pavement performance. The RuFiAC mixture has the potential to redefine pavement construction materials in terms of performance and potential applications due to its high performance to cost ratio. For example, increase in cost for Airport pavement is about 11% for fiber-reinforced pavement, which can be suffix by improving only 1-year of life extension. However, the life extension observed is several of years for fiber-reinforced pavements. Further 33% reduction in $CO_2$ is expected in these Airports pavements due to increased service-life and low maintenance. Due to enhanced mechanical properties for the same pavement performance period the highway pavement thickness can also be reduced up to 40%, thus causing substantial savings. Therefore, using this novel RuFiAC mixture provides cost-effective solutions to pavement performance and management operations.

This invention is a leap forward towards the basic understanding of constructing advanced high performance asphalt composite using microfibers and tire-rubber particles. Increasing construction activities, combined with the rising cost of materials, have led to pressing need to improve the materials, infrastructure management tools, design procedures and performance prediction abilities. The proposed innovation directly addresses such needs by developing sustainable and durability pavement materials. The proposed innovation has a high potential of for commercialization and being licensed for its use.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

The RuFiAC material of the current invention experiences enhanced strength, stiffness, fracture toughness and improved viscoelastic behavior. Such advanced material will aid in mitigating flexible pavement cracking. Most common distress in flexible pavement is the pavement cracking including reflective cracks, transverse, longitudinal and fatigue cracks. Reflective crack is the direct result of horizontal and vertical movements of the Portland cement (PCC) slabs at the joints and cracks in the underlying PCC or HMA pavement or soil-cement base layer. Such movements are mainly due to temperature changes and repeated traffic loads that induce tensile, shear and bending stress concentrations in the overlaid asphalt layer. This mechanism will lead to micro-crack initiation and then macro-crack and propagation in the HMA layer. Typical reflective crack mechanism in composite pavement is shown in FIG. 1. Several strategies are utilized to minimize the stress concentration at the crack tip such as: stress relief & stress absorbing interlayer such as asphalt surface treatments, geotextiles, and unbound granular material. Additional techniques include rubblization of existing PCC slab as well as saw-cut and seal asphalt overlay at the PCC joint/crack. These techniques are job specific and most of it does not provide cost-effective solution. Therefore, there is a need to develop high performance asphalt composite that offers reduced life-cycle cost of pavements.

Fiber reinforced HMA mixture has shown high potential in enhancing the strength and fracture toughness of asphalt mixtures. Similarly, tire-rubber modified HMA mixture has exhibited improved performance in terms of resilience and viscoelastic behavior when used as a part of aggregate structure. The benefits of both fibers and tire-rubber modification will be utilized to invent high performance asphalt composite (RuFiAC) mixtures. The invention perfects the said innovation by evaluating various mix parameters affecting the RuFiAC mixture.

The RuFiAC mixture will have high potential of commercialization and implementation potential by federal, state, and private industry due to its following characteristics:

Enhanced stiffness, strength, and fracture toughness due to microfiber addition (High Performance, Durable, Sustainable);

Improved stiffness, resilience, and viscoelastic behavior due to the addition of tire-rubber particles (High Performance);

Consumption of recycled materials through the replacement of aggregate by tire-rubber particles (Green and Sustainable); and Reduced life-cycle costs of flexible pavement due to high performance and low maintenance costs (Economical).

The RuFiAC mixture could be utilized as bridge overlay, flexible pavement layer or as an interlayer system to minimize the stress concentration in overlaid asphalt pavement at the PCC joint or at the pavement cracks to mitigate the reflective cracking.

Example 1

Figure 2:
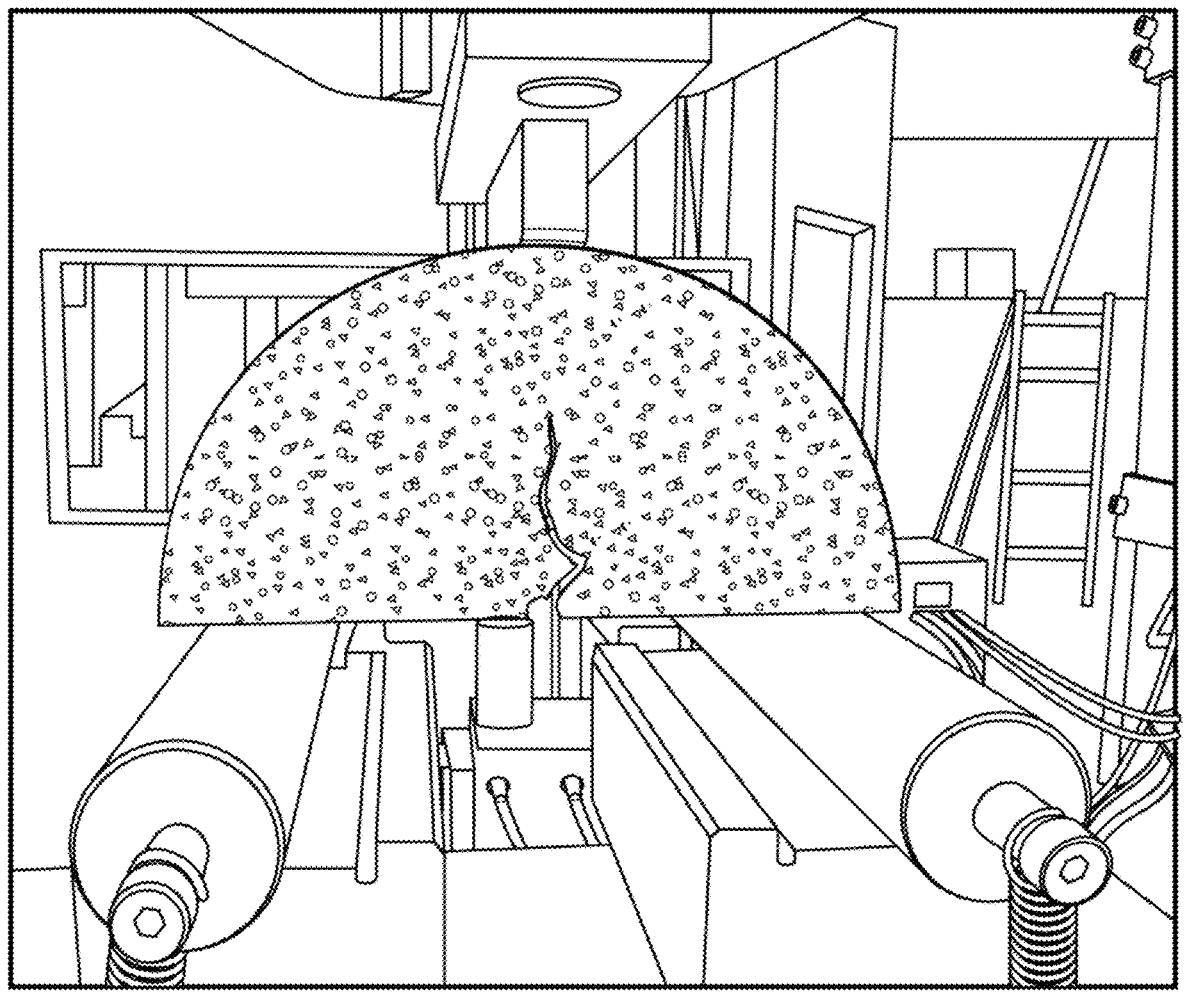
FIG. 2 is HMA semi-circular beam (SCB).
Figure 3:
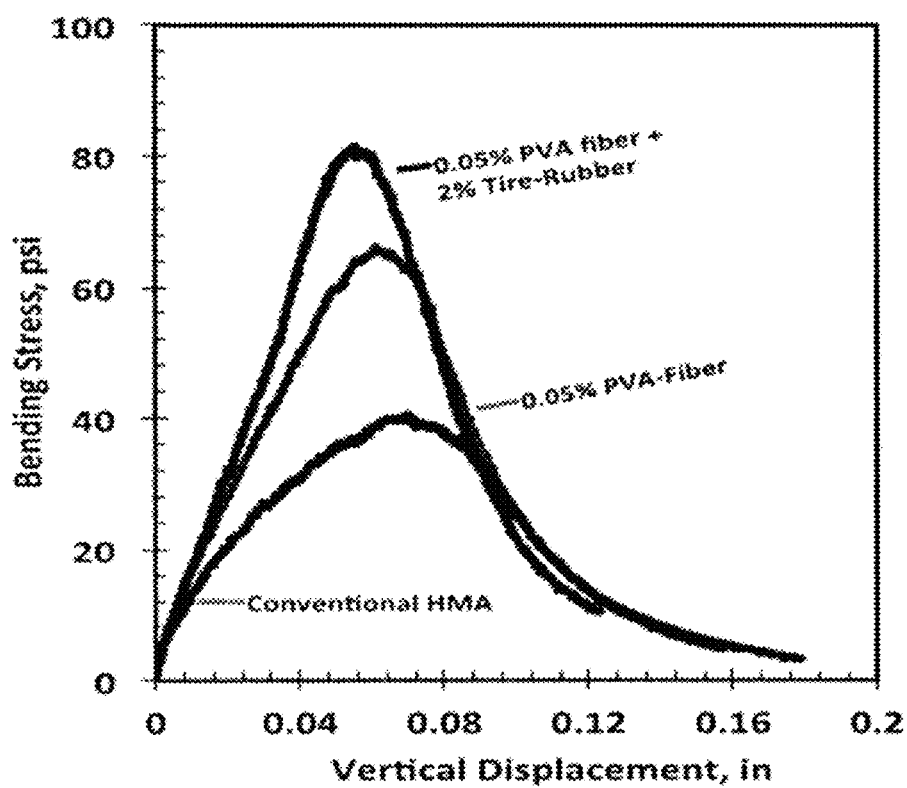
FIG. 3 is Comparison of conventional and RuFiAC mixtures.

Semi-circular beam (SCB) specimens were prepared and tested as shown in FIG. 2. The RuFiAC mixture was prepared by using 0.05% Polyvinyl Alcohol (PVA) microfiber and 2% tire-rubber particles, by weight of the mix. It can be seen in FIG. 3 that the addition of microfiber and tire-rubber particles significantly increased the stiffness and bending stress at failure as appose to conventional asphalt mixtures while keeping the load-line vertical displacement almost the same. This result indicates that the newly developed RuFiAC mixture will absorb more energy before complete failure relative to conventional mixtures, thus exhibiting higher fracture toughness.

RuFiac HMA mix design was accomplished using the Superpave mix design procedure. Superpave gyratory compactor was utilized to compact 150 mm diameter and 115 mm tall cylindrical specimen. The optimum asphalt content was based on target air void of 4% along with satisfying other mix design parameter. Gap-graded aggregate gradation with nominal maximum size of 12.5 mm was used to account for tire-rubber addition. Fine particle passing No. 200 was adjusted to compensate for hydrated lime addition as anti-stripping agent (2% to 5% by weight of mix). Two sizes of recycled tire-rubber particles (a) Coarse: passing #10 sieve and retained #30 sieve, and (b) Fine: passing #30 sieve and retained at #100 sieve were used. The mix design yielded optimum asphalt content of 4.7% for control (conventional) mix and for RuFiac mix the optimum asphalt content was in the range of 5.7% to 6% by wt. of mix. The following procedure was adopted for mixing and compaction of RuFiac samples.

The required amount of asphalt (conventional PG64-22, Modified 76-28) was preheated heated in an oven at its compaction temperature of 150-155° C. for about 1-2 hr. Similarly, aggregates were preheated in an oven at mixing temperature of 150-155° C. for 3 hr. Required amount of rubber particles was measured, usually 1% to 3% by wt. of mix, specifically 2% for this study. The ratio of coarse to fine rubber particles (Coarse/Fine) was in the range of 0.5 to 2, specifically 1 for this study. The rubber particles were premixed with hydrated lime (2% to 5% by wt of mix) at room temperature, specifically 3% for this study. The mix of rubber particles and hydrated lime was then mixed with preheated aggregates. The required amount of fibers was then hand mixed with the mix of aggregate, hydrated lime and rubber particles (polyvinyl alcohol fiber, polyethylene fibers, polyester fibers, and aramid fibers), usually 0.0125% to 0.075% by wt. of mix and fiber length ranging from 9 mm to 25 mm. Required amount of preheated asphalt was then added last and all the constituents were mixed thoroughly using the mechanical mixture. The RuFiac mixture was then placed back in the oven at compaction temperature of 140-150° C. for another 1.5 hr for aging. Finally, the above RuFiac mixture was poured in the preheated compaction mold and compacted using the gyratory compactor to construct 150 mm diameter and 115 mm tall specimen for further mechanical testing For the purpose of understanding the Tire-Rubber and Fiber Reinforced High Performance Asphalt Composite (RuFiAC), references are made in the text to exemplary embodiments of an Tire-Rubber and Fiber Reinforced High Performance Asphalt Composite (RuFiAC), only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

The invention claimed is:

1. A method for creating high performance asphalt comprising:
    a. heating a set amount of asphalt to create heated asphalt;
    b. heating a set amount of aggregate to create heated aggregate;
    mixing rubber particles with hydrated lime to create a rubber lime mixture, wherein said rubber particles comprise a coarse size and a fine size, and wherein a ratio of coarse to fine rubber particles in the range of 0.5 to 2;
    c. combining said rubber lime mixture and said heated aggregate to create a rubber aggregate mixture;
    d. adding a set amount of fibers to said rubber aggregate mixture to create an intermediary mixture, wherein said fibers have length from 9 mm to 25 mm;
    e. combining said intermediary mixture with said heated asphalt to create a final mixture;
    f. aging said final mixture; and
    g. compacting said final mixture.

2. The method of claim 1 wherein said asphalt comprises PG64-22.

3. The method of claim 1 wherein said asphalt comprises modified 76-28.

4. The method of claim 1 wherein said heating a set amount of asphalt step was performed in a conventional oven at temperatures between 150 and 155 degrees Celsius.

5. The method of claim 4 wherein said heating a set amount of asphalt step was performed 1 to 2 hours.

6. The method of claim 1 wherein said rubber lime mixture comprises between 2 and 5 percent by weight of said mixture of said hydrated lime.

7. The method of claim 1 wherein said fibers comprise at least one of the group consisting of polyvinyl alcohol fiber, polyethylene fibers, polyester fibers, and aramid fibers.

8. The method of claim 7 wherein said fibers comprise a polyvinyl alcohol fiber.

9. The method of claim 8 wherein said final mixture has a polyvinyl alcohol fiber content of 0.05 wt %.

10. The method of claim 1 wherein said aging step comprises heating said final mixture at 140 to 150 degrees Celsius.

11. The method of claim 1 wherein the final mixture has a tire-rubber particles content of 1 wt % to 3 wt %.

12. The method of claim 1 wherein said rubber aggregate mixture has a fiber content of 0.0125 wt % to 0.075 wt %.

13. The method of claim 1 wherein said final mixture has air void of 4%.

14. The method of claim 1 wherein said aggregate has a size of 12.5 mm.

15. The method of claim 1 wherein said final mixture has an asphalt content in the range of 5.7 wt % to 6 wt %.

* * * * *